US006896094B2

(12) United States Patent
Chabaan

(10) Patent No.: US 6,896,094 B2
(45) Date of Patent: May 24, 2005

(54) H-INFINITY CONTROL AND GAIN SCHEDULING METHOD FOR ELECTRIC POWER ASSIST STEERING SYSTEM

(75) Inventor: Rakan C. Chabaan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 10/669,358

(22) Filed: Sep. 24, 2003

(65) Prior Publication Data

US 2004/0055810 A1 Mar. 25, 2004

Related U.S. Application Data

(62) Division of application No. 10/012,060, filed on Oct. 20, 2001, now Pat. No. 6,651,771.

(51) Int. Cl.[7] .............................................. B62D 5/04
(52) U.S. Cl. ........................................ 180/446; 701/42
(58) Field of Search ............................... 180/443, 446, 180/402; 701/41, 42, 44; 318/432, 433

(56) References Cited

U.S. PATENT DOCUMENTS

| | | | |
|---|---|---|---|
| 4,703,821 A | 11/1987 | Shimizu | 180/79 |
| 4,840,389 A | 6/1989 | Kawabe et al. | 280/91 |
| 4,871,039 A | 10/1989 | Daido et al. | 180/79 |
| 5,038,269 A | 8/1991 | Grimble et al. | 364/148 |
| 5,198,981 A | 3/1993 | Collier-Hallman et al. | 364/424 |
| 5,202,830 A | 4/1993 | Tsurumiya et al. | 364/424 |
| H1410 H | 1/1995 | Hartley | 364/148 |
| 5,627,750 A | 5/1997 | Kono et al. | 364/424 |
| 5,631,529 A | 5/1997 | Shimizu et al. | 318/432 |
| 5,642,722 A | 7/1997 | Schumacher et al. | 123/673 |
| 5,690,087 A | 11/1997 | Schumacher et al. | 123/675 |
| 5,697,867 A | 12/1997 | Kono et al. | 477/176 |
| 5,732,373 A | 3/1998 | Endo | 701/42 |
| 5,809,438 A | 9/1998 | Noro et al. | 701/41 |
| 5,819,714 A | 10/1998 | Bush et al. | 123/673 |
| 5,836,418 A | 11/1998 | Kim | 180/422 |
| 5,857,443 A | 1/1999 | Kono et al. | 123/339.2 |
| 5,859,774 A | 1/1999 | Kuzuya et al. | 364/176 |
| 5,861,725 A | 1/1999 | Endo et al. | 318/434 |
| 5,908,457 A | 6/1999 | Higashira et al. | 701/41 |

(Continued)

FOREIGN PATENT DOCUMENTS

EP  1125823  8/2001

OTHER PUBLICATIONS

"Vehicle Dynamics and Control Synthesis for Four–Wheel Steering Passenger Cars," by You et al., Dec. 1998, pp. 449–461.

"Electric Power Steering with H–Infinity Control Designed to Obtain Road Information," by N. Sugitani, Y. Fujuwara, K. Uchida, and M. Fujita, Proc. Of the ACC, Albuquerque, New Mexico, Jun. 1997, 5 pages.

"Power Steering 'Road Feel'," by F. J. Adams, SAE Paper 8300998, 1983, 9 pages.

(Continued)

Primary Examiner—Daniel G. DePumpo
(74) Attorney, Agent, or Firm—Gregory P. Brown

(57) ABSTRACT

A steering system (10) and method (70) for controlling the steering of a vehicle having a steering assembly including a steering wheel (12), a steering column (14) connected to said steering wheel (12), and an electric motor (20) operatively engaged with the steering assembly for supplying torque assist. A steering angle sensor (32) is employed for sensing an angular position $\theta_c$ of the steering column (14). The steering system has first and second H-infinity controllers (64A and 64B) coupled in a feedback path (44) for generating first and second feedback signals as a function of the driver torque and first and second characteristics ($J_C$ and $K_C$) of the steering system. One of the first and second feedback signals is selected and the selected feedback signal is combined with a feedforward signal to generate a motor control signal (U) as a function of the estimated torque.

9 Claims, 6 Drawing Sheets

U.S. PATENT DOCUMENTS

| | | | | |
|---|---|---|---|---|
| 6,148,949 | A | 11/2000 | Kobayashi et al. | 180/446 |
| 6,250,419 | B1 | 6/2001 | Chabaan et al. | 180/443 |
| 6,293,366 | B1 * | 9/2001 | Chabaan et al. | 180/446 |
| 6,407,524 | B1 * | 6/2002 | Endo et al. | 318/432 |
| 6,450,112 | B1 * | 9/2002 | Deghuee | 114/144 R |

OTHER PUBLICATIONS

"Analysis of Stiffness and Feel for a Power–Assisted Rack and Pinion Steering Gear," by J. Baxter, SEA paper 880706, 1998, 7 pages.

"Control and Steering Feel Issues in the Design of an Electric Power Steering System," by A. Zaremba, M. Liubakka, and R. Stuntz, Proc. Of the ACC, 1998, 5 pages.

"Vibration Control Based on Dynamic Compensation in an Electric Power Steering System," by A. Zaremba, M. Liubakka, and R. Stuntz, Prep. Of the Int. Conf. On Control of Oscillations and Chaos, St. Petersburg, vol. 3, 1997, pp. 453–456.

"Dynamic Analysis and Stability of a Power Assist Steering System," by A. Zaremba and R. Davis, Proc. Of the ACC, Seattle, Washington, Jun. 1995, pp. 4253–4257.

* cited by examiner

H-INFINITY CONTROL AND GAIN SCHEDULING METHOD FOR ELECTRIC POWER ASSIST STEERING SYSTEM

CROSS-REFERENCE TO RELATED APPLICATION

This application is a divisional of application Ser. No. 10/012,060, entitled "H-INFINITY CONTROL AND GAIN SCHEDULING METHOD FOR ELECTRIC POWER ASSIST STEERING SYSTEM," filed on Oct. 20, 2001, now issued as U.S. Pat. No. 6,651,771, which is hereby incorporated herein by reference.

FIELD OF THE INVENTION

The present invention generally relates to vehicle steering systems, and more particularly relates to an electric power assist steering system and method of controlling electric power steering assist for a steered vehicle.

BACKGROUND OF THE INVENTION

Conventional steering of a wheeled motor vehicle is typically achieved by the vehicle operator (driver) rotating a steering wheel that is arranged in the passenger compartment of the vehicle to turn the steerable road wheels. Conventional steering systems generally include a rack and pinion type steering assembly operatively coupled to the road wheels and a steering column coupled between the steering wheel and the rack and pinion assembly for converting angular rotation of the steering wheel into a sliding motion on the rack to effect steering of the road wheels. In order to reduce the amount of driver effort (i.e., torque) that is required to rotate the steering wheel, conventional steering systems typically include a power assisted actuator that assists the operator with rotation of the steering wheel to overcome opposing forces such as road load forces on the road wheels and friction forces in the steering assembly. The amount of power assistance generally varies depending on the speed of the vehicle and the amount of effort applied by the vehicle operator to the steering wheel. Conventional power assist steering systems typically employ either hydraulic power assist or electric power assist. In contrast to hydraulic power assist systems, the electric power assist steering system offers variable assist capabilities, more efficient energy consumption, reduced mechanism complexity, increased reliability, and responsive on-demand steering assist, as well as other advantages.

The electric power assist steering (EPAS) system employs an electric motor for applying a controlled amount of torque to the steering assembly to assist the vehicle operator with angular rotation of the steering wheel. The conventional electric power assist steering system is generally configured with a feedback control system that electrically amplifies the driver steering torque input to the steering system to realize improved steering comfort and performance. The electric power assist steering system typically includes a rotatable steering wheel, a steering column, a rack and pinion assembly, a gear box assembly, and an electric motor. The conventional electric power assist steering system also employs a pinion torque sensor, as well as various other sensors. The pinion torque sensor is generally located between the steering column and the rack and pinion assembly and senses the amount of torque applied at the pinion. The measured pinion torque serves as an approximation of the input torque applied to the steering wheel by the vehicle operator and is commonly used to determine the amount of torque assist to be provided by the electric motor. The amount of torque assist is typically calculated from a tunable non-linear boost curve which generates a control command signal to control the electric motor to achieve the desired level of power steering assist.

Conventional electric power assist steering systems generally employ control systems that rely on intuition and trial and error tuning of either proportional-integral-differential (PID) controllers or lead-leg controllers. Due to inevitable modeling errors, sensor noises, and external disturbances, the steering system controller generally must perform robustly in the presence of such uncertainties. In order to match the performance of the electric power assist steering system, the non-linear boost curve output often requires a very large slope in order to achieve the optimal desired steering feel. To control this type of steering system at a very high gain with the boost curve, it is typically difficult for conventional steering controllers to maintain the stability as well as the robustness, i.e., component deterioration, mechanical non-linearities, and road disturbances, of the closed loop control system.

A more recent approach to electric power assist steering is disclosed in U.S. Pat. No. 6,250,419, which is assigned to the assignee of the present application, and is hereby incorporated by reference. The aforementioned patent teaches a steering system employing a torque estimator for determining an estimated torque signal and an H-infinity controller coupled in a feedback path for generating a feedback signal which is combined with a feedforward signal to generate a motor control signal as a function of the estimated torque. While the above-described H-infinity controller based steering system provides enhanced stability and robustness (e.g., component deterioration, mechanical non-linearities, and road disturbance), the steering system may not always achieve a desired steering feel that is comparable to the steering feel achieved with a conventional hydraulic steering system due to non-linearities in the system. This is at least in part due to the fact that non-linearities in the system and the center of gravity of the steering wheel may vary as a vehicle operator rotates the steering wheel while driving. Additionally, the steering column stiffness generally varies based on the steering angle and vehicle speed.

As shown in FIGS. 6A and 6B, the vehicle steering wheel 12, which is generally circular (e.g., ring-shaped), has a center position 100 which is commonly centered above the center of the steering column shaft 102, typically by about 3 to 5 mm. The center of the steering shaft 102 is the point about which the steering wheel 100 rotates. In addition, the steering wheel 100 has a center of gravity 104 at a position which typically is below the center of rotation of shaft 102 when the steering 100 is aligned in the straight-ahead on-center position as shown in FIG. 6A. When a driver turns the steering wheel clockwise to an off-center position as shown in FIG. 6B, a pendulum centering moment results. The pendulum centering moment causes the steering wheel 100 to want to return to the on-center position. Further, there exists a moment of inertia that must be overcome when starting and stopping a turn of the steering wheel solely as a result of the shape and mass arrangement of the vehicle steering wheel 100. Accordingly, the steering feel in prior known electric power steering systems will vary when the steering wheel is positioned in on-center positions as compared to off-centered positions.

Accordingly, it is desired to provide for an electric power assist steering system for a vehicle that provides torque assist to the vehicle operator to achieve optimal steering performance. In particular, it is desired to provide for an electric power assist steering control system for controlling the amount of electric power assist in a manner that offers stability, robustness of the system and desired steering feel, without sacrificing steering system performance. It is further desirable to achieve optimal steering assist performance while improving on-center and off-center steering feel.

SUMMARY OF THE INVENTION

In accordance with the teachings of the present invention, a steering system and method of controlling the steering of a vehicle are provided. According to one aspect of the present invention, a method of controlling an electric power assist steering system having a steering assembly including a steering wheel connected to a steering column for a vehicle is provided. The method includes the steps of providing a first H-infinity controller in a feedback loop and configured according to a first characteristic of the steering system, and providing a second H-infinity controller in the feedback loop and configured according to a second characteristic of the steering system. The method also includes the steps of determining a torque signal that is substantially indicative of driver torque applied to the steering wheel, processing the torque signal with the first H-infinity controller and generating a first feedback signal, and processing the torque signal with the second H-infinity controller and providing a second feedback signal. The method measures a steering angle position of the steering system and generates a steering angle signal indicative thereof, and selects one of the first and second feedback signals as a function of the measured steering angle signal. The method further includes the steps of generating a motor control signal as a function of the selected feedback signal, and applying the motor control signal to an electric motor to generate a controlled amount of steering torque assist.

According to other aspects of the present invention, an electric power assist steering system for a vehicle and a control system for controlling electric motor torque assist to an electric power assist steering system for a vehicle are provided. The electric power assist steering system includes a steering assembly including a steering wheel connected to a steering column, and an electric motor operatively engaged with the steering assembly for supplying steering torque assist. The system also includes a torque detector for detecting driver torque and generating a driver torque signal indicative thereof, and a steering column sensor for sensing steering angle of the steering column and generating a signal indicative thereof. The system further includes a first H-infinity controller coupled in a feedback control loop for generating a first feedback control signal as a function of the torque signal and a first characteristic of the steering system, and a second H-infinity controller coupled in the feedback control loop for generating a second feedback control signal as a function of the torque signal and a second characteristic of the steering system. A switch is also included for selecting one of the first and second feedback control signals as a function of the sensed steering angle. Accordingly, the present invention provides for a stable and robust control system with improved on-center and off-center steering feel. Accordingly, the H-infinity feedback control employed in the system and method of the present invention advantageously provides enhanced stability and robustness of the system and desired steering feel, without sacrificing system performance.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figures 1, 4:
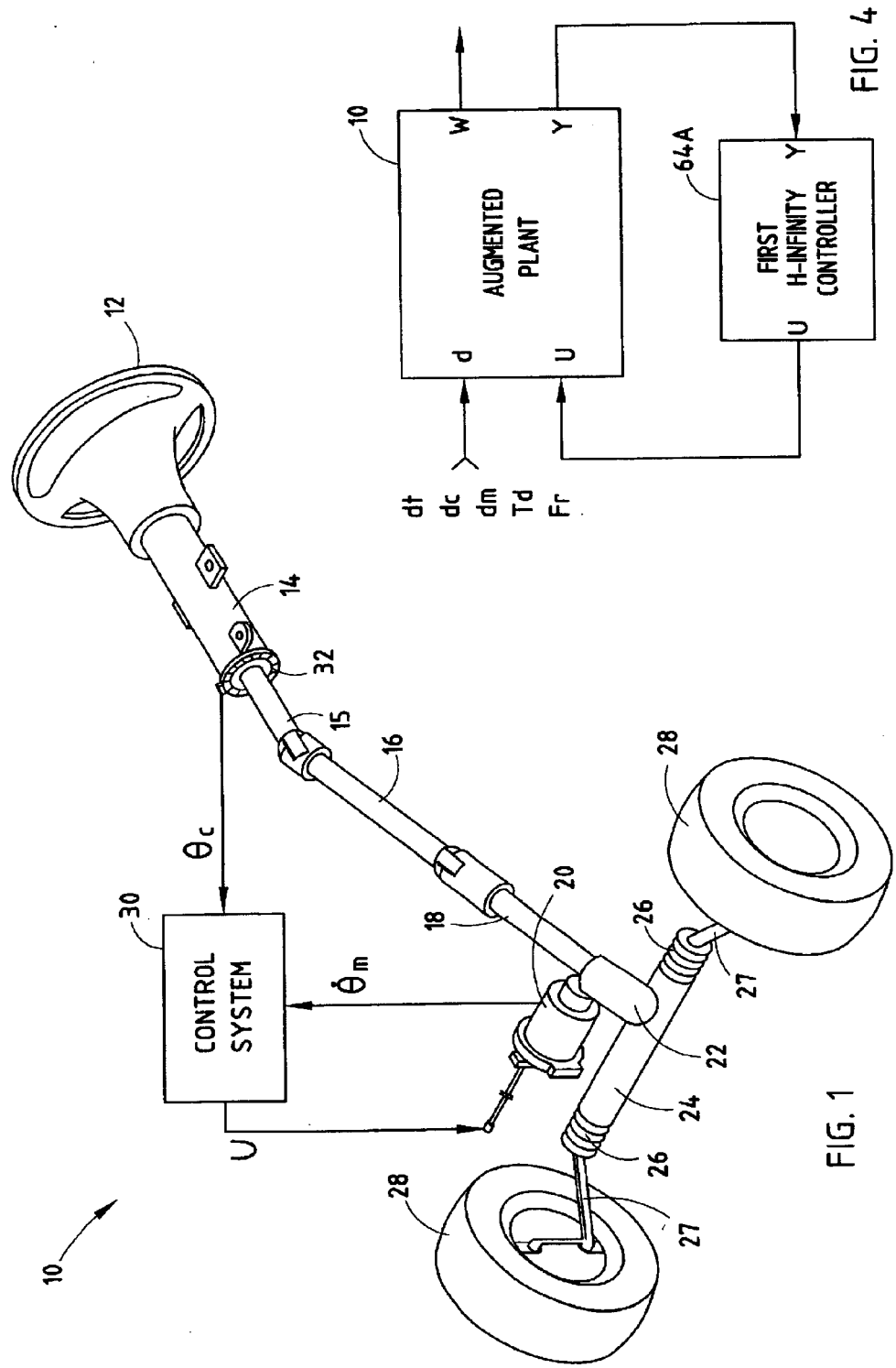
FIG. 1 is a diagrammatic view of an electric power assist steering system for a wheeled vehicle according to the present invention.
FIG. 4 is a simplified block diagram further illustrating one of the H-infinity controllers for controlling the steering system.

Referring to FIG. 1, an electric power assist steering (EPAS) system 10 equipped with a control system 30 according to the present invention is illustrated for use in steering a wheeled vehicle, such as a motor vehicle. The steering system 10 is described herein in connection with the power assisted steering of a pair of road wheels 28, such as the front wheels of the motor vehicle, adapted to be engaged in friction contact with the ground, such as a roadway. However, it should be appreciated that the steering system 10 of the present invention may be employed to steer any number of front and/or rear wheels of a steered vehicle.

The electric power assist steering system 10 has a steering assembly which includes a rotatable steering wheel 12 that is generally disposed in the passenger compartment of the vehicle and is manually rotatable by the driver of the vehicle to steer the road wheels 28. The steering assembly also includes a steering column 14 operatively coupled to steering wheel 12. The steering column 14 has a rotary shaft 15 that rotates in synchronization with the steering wheel 12. Shaft 15 is preferably directly connected to steering wheel 12. The steering assembly as shown employs an intermediate shaft 16 and a pinion shaft 18, both operatively engaged with steering column 14. Steering column 14, intermediate shaft 16, and pinion shaft 18 are preferably interconnected via universal joints as is well-known in the vehicle steering art. While steering column 14, intermediate shaft 16, and pinion shaft 18 are shown in this example, it should be appreciated that any number of rotating shafts and various mechanical assemblies may be coupled to steering wheel 12 to actuate the steerable road wheels 28 in response to actuation of steering wheel 12.

An electric motor 20 is coupled to the pinion shaft 18 to provide torque assist to shaft 18 such as to assist the driver of the vehicle in rotating the steering wheel 12. The electric motor 20 provides power (torque) assist to aid in the steering of the road wheels 28 so as to reduce the amount of effort required by the driver. Power steering assist reduces the effects of steering assembly friction and road load. The pinion shaft 18 is coupled at one end to a pinion gear assembly 28 for converting angular rotation of the pinion shaft 18 to linear movement on a rack 24. The rack 24 is coupled on opposite ends to tie rods 26 and connector rods 27 which are movable to control left and right rotation of road wheels 28. It should be appreciated that the steering wheel 12, steering column 14, shafts 16 and 18, pinion gear assembly 22, rack 24, tie rods 26, connector shafts 27, and road wheels 28 may include a conventional vehicle steering assembly.

The electric power assist steering system 10 has a control system 30 that controls the amount of torque generated by the electric motor 20. Control system 30 includes two or more microprocessor-based H-infinity controllers having memory programmed to operate control routines, process input signals, determine torque signals, and generate control signals for controlling the electric motor input command signal U to achieve the desired torque assist $T_a$. The control system 30 is preferably configured with feedback control and feedforward control as described herein. While control system 30 employs microprocessor-based H-infinity controllers, it should be appreciated that various analog and digital circuits could be employed to control the electric motor power assist without departing from the teachings of the present invention.

In addition, steering system 10 further includes a steering angle sensor 32 for measuring the steering column position angle $\theta_c$. The steering angle sensor 32 senses angular position of the rotatable shaft 15 of the steering column 14. The measured steering column position angle $\theta_c$ provides a measurement of the angular position of the steering wheel 12. The measured steering column angle $\theta_c$ is input to the control system 30 and is used to estimate torque signals according to one embodiment. The control system 30 also monitors the angular velocity $\dot{\theta}_m$ of electric motor 20. The electric motor velocity $\dot{\theta}_m$ may be measured directly from the electric motor input command signal U, or may be remotely sensed by an angular speed sensor or by differentiating the output of an angular position sensor.

Figure 2:
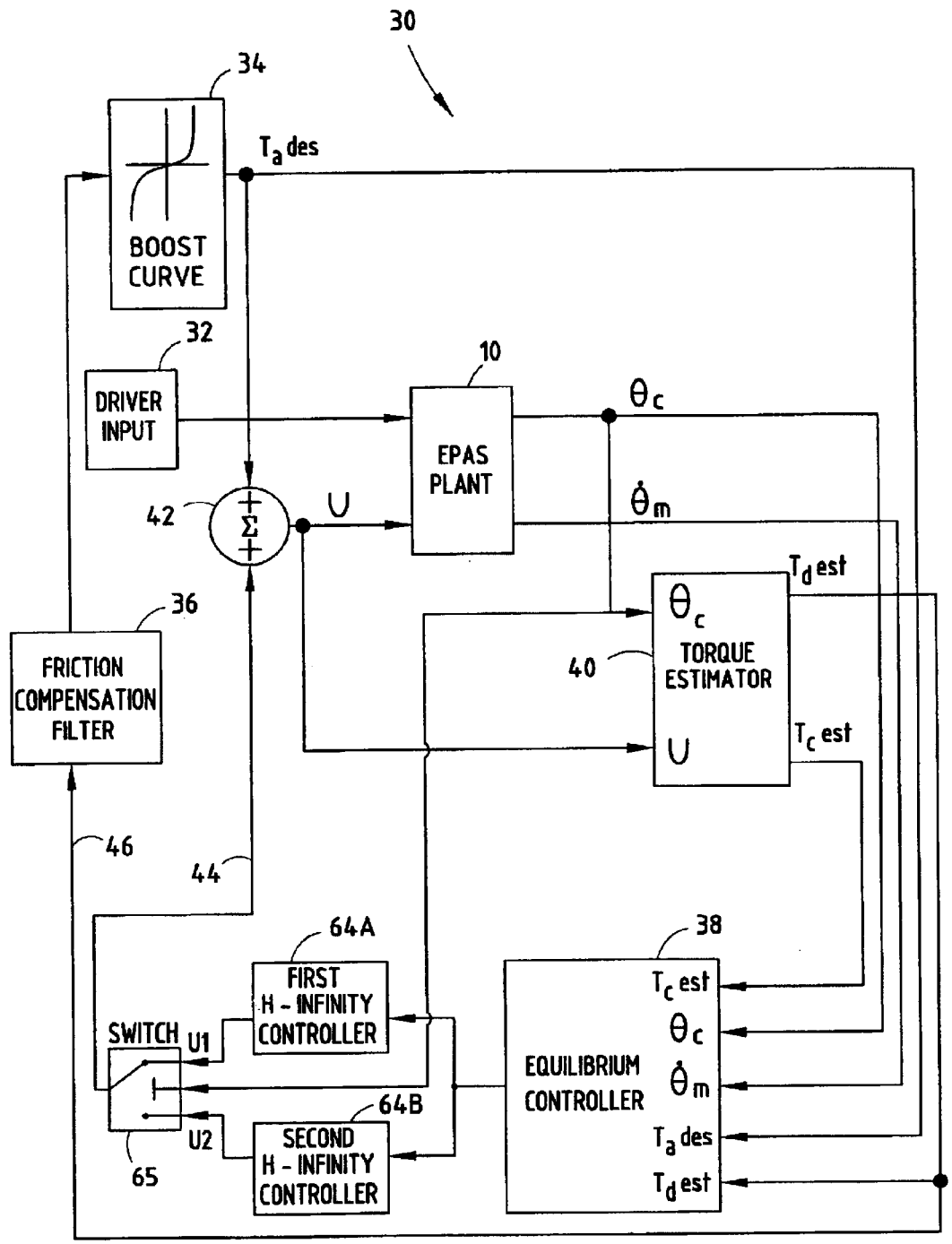
FIG. 2 is a block diagram of the control system employing two H-infinity controllers for controlling the electric power assist steering system.

Referring to FIG. 2, the control system 30 is illustrated therein for controlling the electric power assist steering system 10 according to the present invention. The control system 30 is shown made up of various control devices that may be programmed with control routines for performing one or more designated control functions to generate a desired electric motor torque assist to achieve enhanced vehicle steering performance. As shown, the control system 30 incorporates a function block 10 representative of the electric power steering assist system shown having a driver input 32 which is the driver applied torque. The electric power assist steering system 10 receives the driver input 32 in the form of a torque applied to the steering wheel 12. In addition, steering system 10 receives a motor input command signal U. Electric power assist steering system 10 further produces the sensed steering wheel position angle $\theta_c$ and electric motor speed $\dot{\theta}_m$.

The control system 30 includes a non-linear boost curve look-up table 34 which receives an estimated driver torque signal and generates a feedforward signal that is added to a feedback signal to produce the motor input command signal U. Boost curve look-up table 34 preferably includes one or more non-linear boost curves which maps the amount of motor input command signal U versus estimated driver torque $T_d$est at various vehicle speeds.

Accordingly, the boost curves are responsive to a sensed vehicle speed (not shown). The boost curve look-up table 34 is capable of providing a large gain, such as a gain having a slope of 700 NM/NM, with the control system 30 of the present invention.

According to one embodiment, the control system 30 includes a torque estimator 40 for estimating the driver torque $T_d$est applied to the steering wheel 12, and for further estimating the pinion torque $T_c$est applied to the pinion shaft 18. The torque estimator 40 receives, as inputs, the sensed angular position $\theta_c$ of the steering column and the electric motor input command signal U. It should be appreciated that, by estimating the driver torque $T_d$est and pinion torque $T_c$est, the torque estimator 40 provides torque estimations which allow for elimination of a conventional pinion torque sensor, thereby reducing the overall cost and complexity of the steering system 10. According to the embodiment shown, torque estimator 40 estimates the driver torque $T_d$est and pinion torque $T_c$est as a function of the sensed steering column angular position $\theta_c$. According to another embodiment, torque estimator 40 estimates the driver torque $T_d$est and pinion torque $T_c$est as a function of the measured angular velocity $\dot{\theta}_m$ of the electric motor. It should be further appreciated that the driver and pinion torque $T_d$est and $T_c$est may otherwise be determined, such as by employing a torque sensor to obtain a driver torque signal $T_d$.

The control system 30 includes an equilibrium controller 38 and first and second H-infinity controllers 64A and 64B, respectively, coupled in a feedback loop 44. Equilibrium controller 38 receives, as inputs, the estimated driver torque $T_d$est and estimated pinion torque $T_c$est, as well as the sensed angular position $\theta_c$, the motor angular velocity $\dot{\theta}_m$, and desired torque $T_d$est. In response to the inputs, equilibrium controller 38 produces an average feedback signal in feedback loop 44 that is further processed by both of the first and second H-infinity controllers 64A and 64B. One of the outputs generated by the first and second H-infinity controllers 64A and 64B is selected by a non-linear switch 65 in response to the steering column angle position signal $\theta_c$ and is summed with the feedforward desired torque signal $T_d$des at summer 42. Summer 42 sums the selected feedback signal on feedback loop 44 with the feedforward signal on feedforward loop 46 to produce the motor input command signal U that drives the electric motor 20.

The first H-infinity controller 64A is configured according to a first characteristic of the steering system. The second H-infinity controller 64B is likewise configured according to a second characteristic of the steering system. The first characteristic and second characteristic of the first and second H-infinity controllers 64A and 64B, respectively, may include a combination of the moment of inertia ($J_C$) and steering shaft torsion stiffness ($K_C$) while the steering column is oriented in on-center and off-center steering positions. With the steering column in an on-center position such as, for example, a steering angle position $\theta_c$ of less than or equal to ±15 degrees (clockwise or counterclockwise relative to the straight wheel centered position), a steering assembly exhibits certain characteristics such as a relatively large moment of inertia ($J_C$) and a relatively large steering shaft torsion stiffness ($K_C$). Either one or both of the large moment of inertia $J_C$ and steering shaft torsion stiffness $K_C$ are employed as the first characteristic for configuring the first H-infinity controller 64A. When the steering assembly is oriented in an off-center steering position such as, for example, a steering angle position of greater than ±15 degrees, the steering assembly may exhibit a lesser moment of inertia ($J_C$) and steering shaft torsion stiffness ($K_C$). Either one or both of the lower moment of inertia $J_C$ and torsion stiffness $K_C$ are used as the second characteristic to configure the second H-infinity controller 64B.

The non-linear switch 65 monitors the steering column angular position $\theta_c$ and selects one of the outputs U1 or U2 generated by the first and second H-infinity controllers 64A and 64B, respectively, depending on the value of the steering angle position $\theta_c$. Hence, if the steering angle position $\theta_c$ is less than or equal to ±15 degrees, the output U1 of the first H-infinity controller 64A is selected as the feedback signal. When the steering column angular position $\theta_c$ is greater than 15 degrees, the output U2 of the second H-infinity controller 64B is selected as the feedback signal.

The feedforward loop 46 includes a friction compensation filter 36 which receives the estimated driver torque $T_d$est and filters out undesirable high frequency signals to compensate for friction forces, such as road load friction and steering column friction. The friction compensation filtered output is supplied as an input to the boost curve look-up table 34 which, in turn, produces the desired torque signal $T_d$des. Accordingly, the control system 30 includes both a feedback loop 44 and feedforward loop 46. It should be appreciated that the feedback loop 44 advantageously provides robust stability of the closed-loop control system 30 and allows for compensation for component changes, while the feedforward loop 46 provides fast steady state response and attenuation of friction. Accordingly, if the torque estimator 40 fails to perform the intended operation, the control system 30 will remain stable. Similarly, if the feedback loop 44 fails to perform the closed-loop control system 30 will likewise remain stable.

Figure 3:
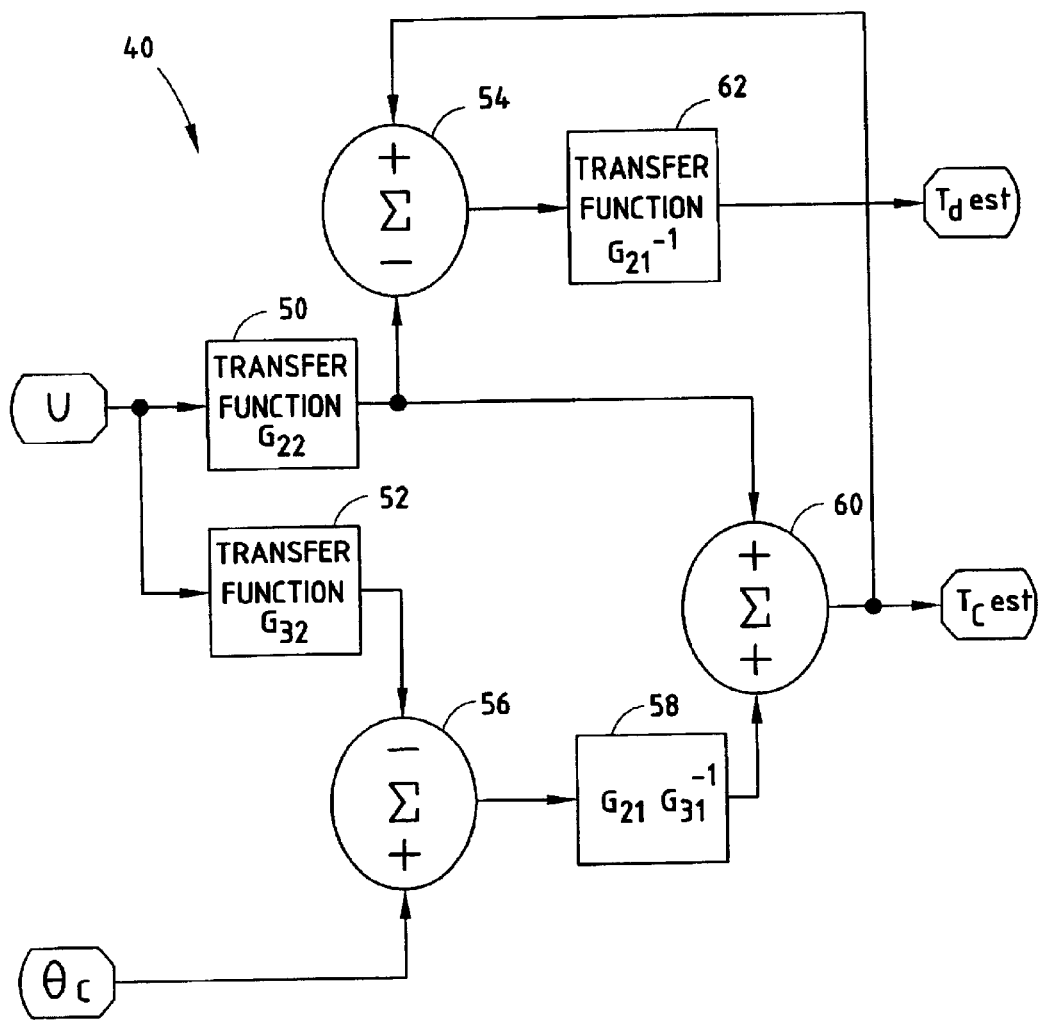
FIG. 3 is a block diagram illustrating functions of the torque estimator for estimating driver torque and pinion torque according to one embodiment.

With particular reference to FIG. 3, the torque estimation functions performed by the torque estimator 40 according to one embodiment are shown in detail for determining the estimated driver torque $T_d$est and estimated pinion torque $T_c$est. The torque estimator 40 includes a number of function blocks containing measured transfer functions including $$G_{21}, G_{21}^{-1}, G_{22}, G_{31}^{-1}, \text{ and } G_{32}.$$

The transfer functions $$G_{21}, G_{21}^{-1}, G_{22}, G_{31}^{-1}, \text{ and } G_{32}$$

are measured based on the dynamic relationship of selected steering system outputs divided by selected inputs, and are defined as follows. Transfer function $G_{31}$ is the relationship of the steering angle position $\theta_c$ divided by the driver torque input $T_d$. Transfer function $G_{32}$ is the relationship of the steering angle position $\theta_c$ divided by the motor input control command signal U. Transfer function $G_{21}$ is the relationship of the pinion torque output $T_c$ divided by the driver torque input $T_d$. Transfer function $G_{22}$ is the relationship of the pinion torque output $T_c$ divided by the motor input control command signal U.

The torque estimator 40 receives as inputs the motor input command signal U and the sensed angular position signal $\theta_c$. The motor input command signal U is input to transfer function $G_{22}$ in function block 50 and is also input to transfer function $G_{32}$ in function block 52. The output of function block 50 is input to a negative input of summer 54 and to a positive input of summer 60, while the output of function block 52 is input to a negative input of summer 56. Summer 56 subtracts the output of function block 52 from the measured steering column angular position $\theta_c$ and provides the resultant subtraction as an input to function block 58. Function block 58 includes the product of transfer function $$G_{21} \text{ and } G_{31}^{-1}. \ G_{31}^{-1}$$

is the inverse of transfer function $G_{31}$. The output of function block 58 is input to a positive input of summer 60, while the other positive input of summer 60 receives the output of function block 50. Summer 60 sums the two inputs to produce the estimated pinion torque $T_c$est, which is one output of torque estimator 40.

The estimated pinion torque $T_c$est is further input to a positive terminal of summer 54. Accordingly, summer 54 subtracts the output of function block 50 from the estimated pinion torque $T_c$est and provides the subtraction as an input to function block 62. Function block 62 includes a transfer function $$G_{21}^{-1},$$

which is the inverse of transfer function $G_{21}$, and produces the estimated driver torque $T_d$est, as a second output of torque estimator 40. Accordingly, the torque estimator 40 estimates both a driver torque estimate $T_d$est, as well as a pinion torque estimate $T_c$est, which are then used to generate the motor control command signal U to control the electric power assist steering system 10 according to the present invention.

The torque estimator 40 is designed to perform torque estimations based on the torque estimation functions which can also be represented as follows:

$$T_d est = [T_c est - G_{22}U][G_{21}]^{-1} \tag{1}$$

$$T_c est = G_{21}[[G_{31}]^{-1}(\Theta_c - G_{32}U)] + G_{22}U \tag{2}$$

The resultant torque estimation equations (1) and (2) are derived from modeling dynamic relationships of the steering system which are established based on Newton's laws of motion. The dynamic model of the steering system is defined by the measured transfer functions as described above. By calculating the motor input control signal U and measuring steering angle position $\theta_c$, the estimated driver torque $T_d$est and estimated pinion torque $T_c$est may be computed, without requiring a direct measurement of torque with a torque sensor.

The present invention employs H-infinity control via at least two H-infinity controllers to process the measured driver torque or driver torque estimation $T_d$est and provide a selected feedback control signal for adjusting the motor command control signal U. The H-infinity control provides robust stability of the closed-loop system, minimizes the effects of rack force resistance and sensor noise and enhances the steering feel. In designating each of the H-infinity controllers 64A and 64B, a typical nonlinear dynamic model of the electric power assist steering system 10 may be considered by the following equations (3) through (5):

$$J_c \ddot{\theta}_c + B_c \dot{\theta}_c + K_c \theta_c = \frac{K_c}{r_p} x_r + T_d + f_c(\theta_c, \dot{\theta}_c) \tag{3}$$

$$M \ddot{x}_r + B_r \dot{x}_r = \frac{K_c}{r_p}\left(\theta_c - \frac{1}{r_p}x_r\right) + \frac{K_m G}{r_p}\left(\theta_m - \frac{G}{r_p}x_r\right) - F_t + f_r(x_r, \dot{x}_r) \tag{4}$$

$$J_m \ddot{\theta}_m + B_m \dot{\theta}_m = T_m - T_a + f_m(\theta_m, \dot{\theta}_m) \tag{5}$$

where $T_d$ and $T_a$ represent the driver torque (Nm) and assist torque (Nm). $\theta_c$, $x_r$, $\theta_c$m represent steering wheel rotary position (rad), rack position (m), and assist motor rotary position (rad), respectively. Plant parameters include $J_c$ (steering column rotational moment of inertia (Kg-m$^2$)), $K_c$ (steering column stiffness (N/rad)), $B_c$ (steering column viscous damping (N-s/rad)), M (mass of the rack (Kg)), $B_r$ (viscous damping on the rack (N-s/rad)), $r_p$ (steering column pinion radius (m)), G (motor gear ratio), $K_m$ (motor shaft and gearbox rotational stiffness (N/rad)), $J_m$ (motor rotational moment of inertia (Kg-m$^2$)), $B_m$ (motor shaft and gearbox viscous damping (N-s/rad)), and $K_t$ (tire or rack centering spring rate (N/m)). $f_c$, $f_r$, and $f_m$ represent nonlinear terms in the model.

To design each of the H-infinity controllers 64A and 64B, the non-linear dynamic model is reformulated in an H-infinity format as follows. First, the electric power assist steering model is linearized near a nominal operating point. The linearized model is then transformed into a state space model. The purpose of the feedback F is to provide robust stability of the closed loop control system 30 and minimize the effect of disturbance on the steering system due to rack force $F_r$, pinion torque noise $d_T$, steering angle sensor noise $d_c$, motor velocity noise $d_m$, and the assist torque. To facilitate the design of the feedback F by using the H-infinity design tools, the system state space models are modified as follows. The original plant may be represented by the following equations (6) and (7).

$$\dot{x} = Ax + B_1 T_d + B_2 F_r + B_3 u \quad (6)$$

$$y = Cx + D_1 T_d + D_2 F_r + D_3 u \quad (7)$$

The variable y is defined by $y = [y_c, y_m]^T$, with $y_c = [T_a, T_c]$ being controlled outputs and $y_m = [T_c, \Theta_c, \dot{\Theta}_m]$ being the measured outputs. The control objectives can be qualitatively stated as follows.

Reduce $\|W_a(T_a - T_a^*)\|_2$.

Reduce $\|W_f(T_c - K_f F_r)\|_2$.

The costs on control $\|e_u\|_2 = \|K_u u\|_2$ are not exceedingly high.

The variables $W_a$ and $W_f$ are weighting functions that define frequency ranges in which the reductions are to be effective. Typical examples of the weighting functions are provided in the following equations (8) and (9).

$$W_a(s) = c_a \frac{b_1 s + 1}{a_1 s + 1} \quad (8)$$

$$W_f(s) = c_f \frac{b_2 s + 1}{a_2 s + 1} \quad (9)$$

Since the weighting functions are defined as dynamic systems, they are incorporated into the state space model. By expanding the state variable $x_1 = [W_a, W_f, x]^T$, the inputs to $u_1 = [d, u]^T$, with $d = [d_T, d_c, d_m, T_d, F_r]$; and the outputs to $y_1 = [w, y]^T$, with controlled output $w = [e_u, e_a, e_f]$ and measured output $y = [T_c, \Theta_c, \dot{\Theta}_m]$, is shown in FIG. 4.

An augmented state space model (plant) can be obtained as shown in equations (10) and (11) as follows.

$$\dot{x}_1 = \tilde{A} x_1 + \tilde{B}_1 u + \tilde{B}_2 d \quad (10)$$

$$y_1 = \tilde{C} x_1 + \tilde{D} \begin{bmatrix} d \\ u \end{bmatrix} \quad (11)$$

where the variables $\tilde{A}$, $\tilde{B}_1$, $\tilde{B}_2$, $B_T$, $B_c$, $B_m$, $B_d$, $B_F$, $\tilde{C}$, and $\tilde{D}$ are represented by the following equations (12) through (21), respectively.

$$\tilde{A} = \begin{bmatrix} -\frac{1}{a_1} & 0 & c_a\left(1 - \frac{b_1}{a_1}\right) C_1 \\ 0 & -\frac{1}{a_2} & c_f\left(1 - \frac{b_2}{a_2}\right) C_2 \\ 0 & 0 & A \end{bmatrix} \quad (12)$$

$$\tilde{B}_1 = \begin{bmatrix} 0 \\ 0 \\ B_3 \end{bmatrix} \quad (13)$$

$$\tilde{B}_2 = [B_T, B_c, B_m, B_d, B_F] \quad (14)$$

Here, $$B_T = \begin{bmatrix} 0 \\ 0 \\ 0 \\ -1 \\ 0 \\ \frac{1}{r_p} \\ 0 \\ 0 \end{bmatrix} \quad (15)$$

$$B_c = \begin{bmatrix} 0 \\ 0 \\ 0 \\ -K_c \\ 0 \\ \frac{K_c}{r_p} \\ 0 \\ 0 \end{bmatrix} \quad (16)$$

$$B_m = \begin{bmatrix} 0 \\ 0 \\ 0 \\ 0 \\ 0 \\ \frac{GK_m}{r_p} \\ 0 \\ -K_m \end{bmatrix} \quad (17)$$

$$B_d = \begin{bmatrix} 0 \\ 0 \\ B_1 \end{bmatrix} \quad (18)$$

$$B_F = \begin{bmatrix} 0 \\ 0 \\ B_2 \end{bmatrix} + \begin{bmatrix} 0 \\ c_f\left(\frac{b_2}{a_2} - 1\right) K_f \\ 0_{6 \times 1} \end{bmatrix} \quad (19)$$

$$\tilde{C} = \begin{bmatrix} 0 & 0 & 0_{6 \times 1} \\ \frac{1}{a_2} & 0 & c_a \frac{b_1}{a_1} C_1 \\ 0 & \frac{1}{a_2} & c_f \frac{b_2}{a_2} C_2 \\ 0 & 0 & C_3 \\ 0 & 0 & C_4 \\ 0 & 0 & C_5 \end{bmatrix} \quad (20)$$

-continued $$\tilde{D} = \begin{bmatrix} 0 & 0 & 0 & 0 & 0 & K_u \\ 0 & 0 & 0 & -\dfrac{c_a b_1 K_a}{a_1} & 0 & 0 \\ 0 & 0 & 0 & 0 & -c_f \dfrac{b_2}{a_2} K_f & 0 \\ \varepsilon & 0 & 0 & 0 & 0 & 0 \\ 0 & \varepsilon & 0 & 0 & 0 & 0 \\ 0 & 0 & \varepsilon & 0 & 0 & 0 \end{bmatrix} \quad (21)$$

Where $\varepsilon$ is a small positive value which makes the lower left 3×5 submatrix of equation (21) full rank. Additionally, the non-zero $K_u$ makes the top right 3×1 submatrix of equation (21) full rank. As a consequence, the H-infinity control design problem is non-singular. For the above modeling, the design problem can be formulated as an H-infinity minimization problem to find the feedback matrix u=F(s)y which minimizes w in the presence of disturbance d. Each of the first and second H-infinity controllers 64A and 64B can be designed using commercially available H-infinity control routines by applying the matrices in equations (12) through (21) to an H-infinity routine to calculate the control system transfer function and thereby configure each of the H-infinity controllers 64A and 64B. One example of a suitable H-infinity control routine includes the H-infinity (sub) optimal controller, also known as the Glover and Doyle method. The H-infinity control routine may employ $\mu$-Tools Toolbox in Matlab/Simulink Software, version 2.0.6 and version 3.0.4 which is commercially available from The MathWorks, Inc. The procedure for implementing the aforementioned Matlab/Simulink Software is provided in the two following commercially available Matlab Toolbox references:

MU Analysis and Synthesis Toolbox; and
Robust Control Toolbox Users Guide.

Figure 5A:
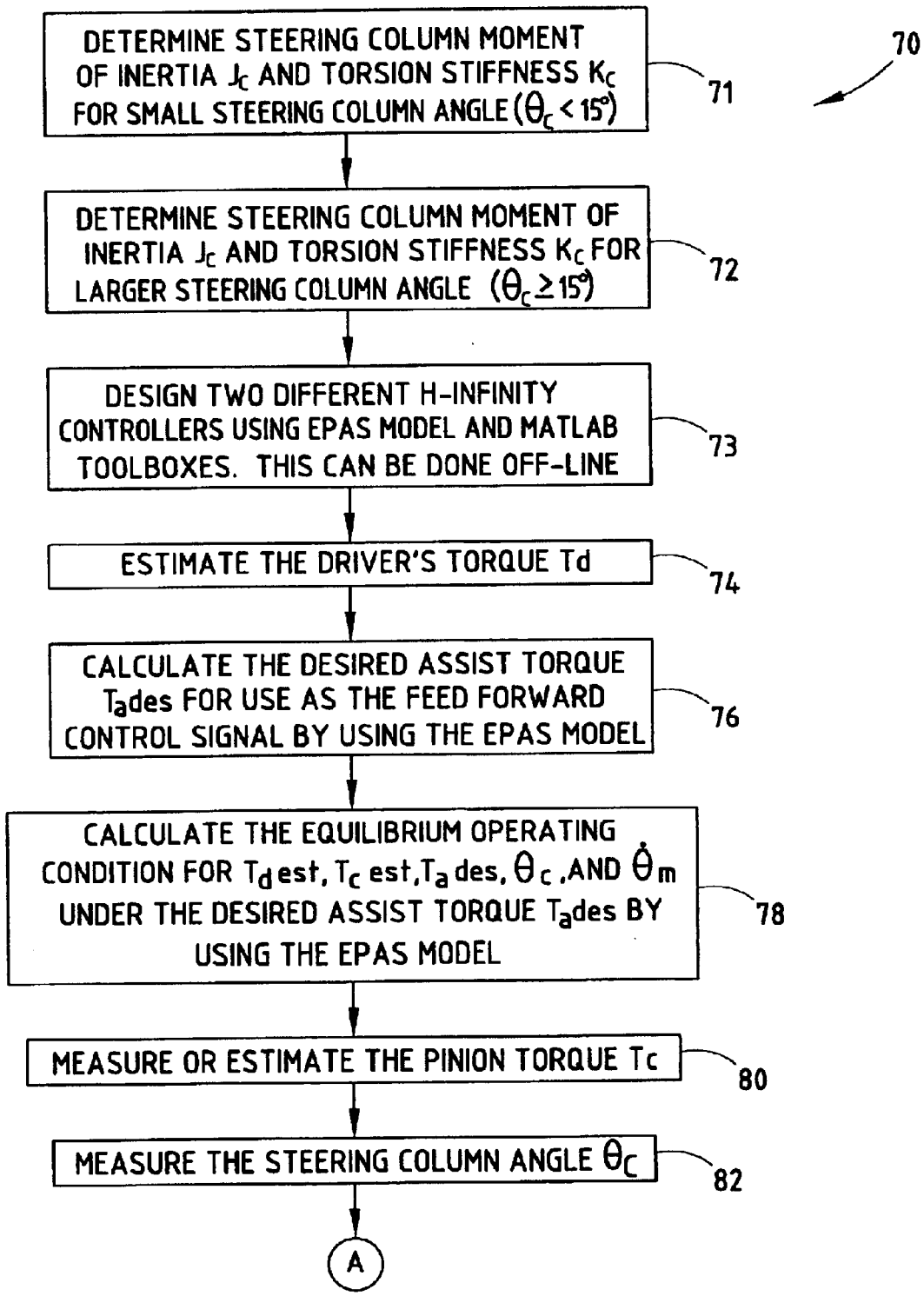
FIGS. 5A and 5B are flow diagrams illustrating a methodology for controlling the electric power assist steering system according to the present invention.
Figure 5B:
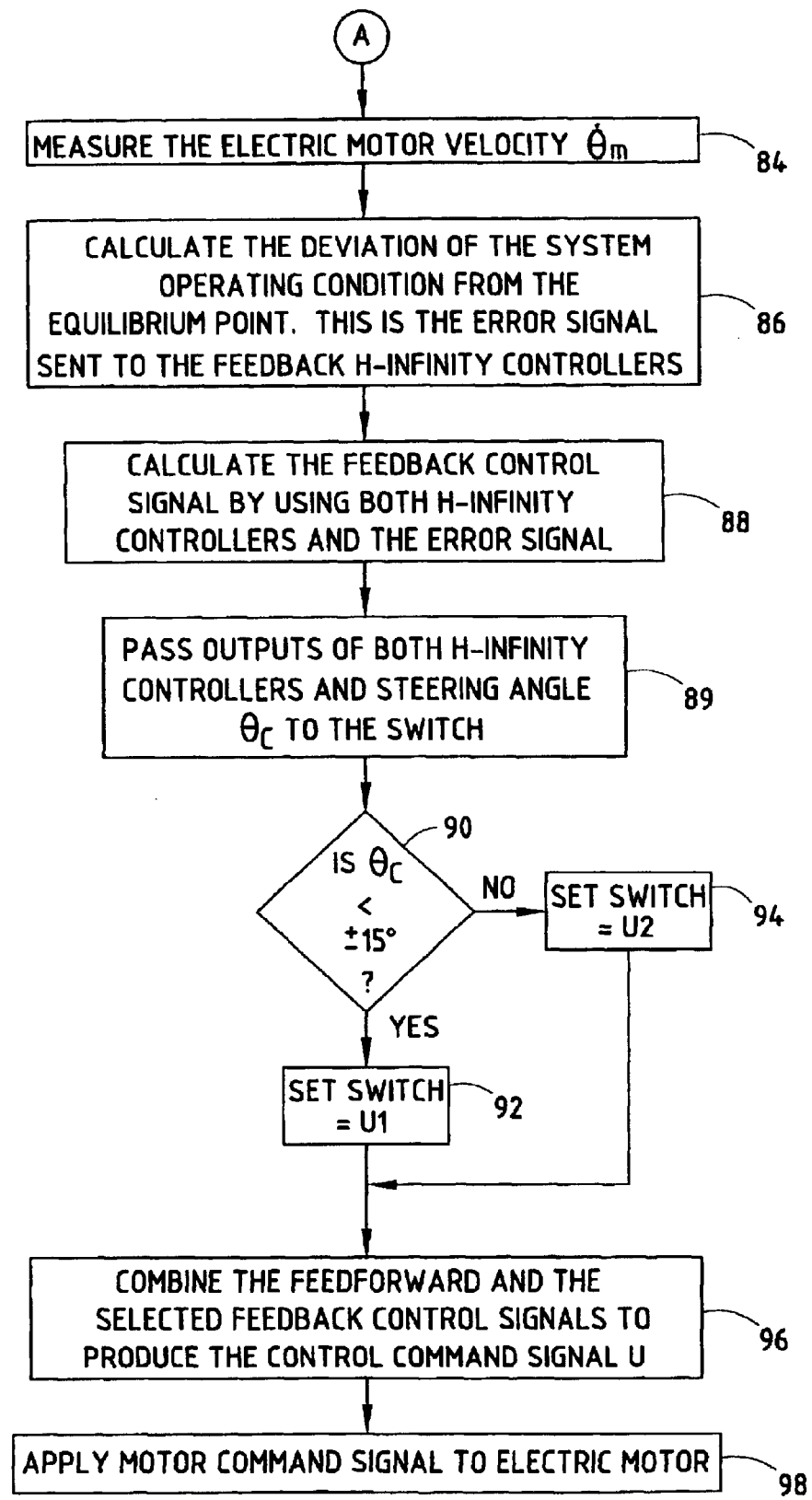
Figure 6A:
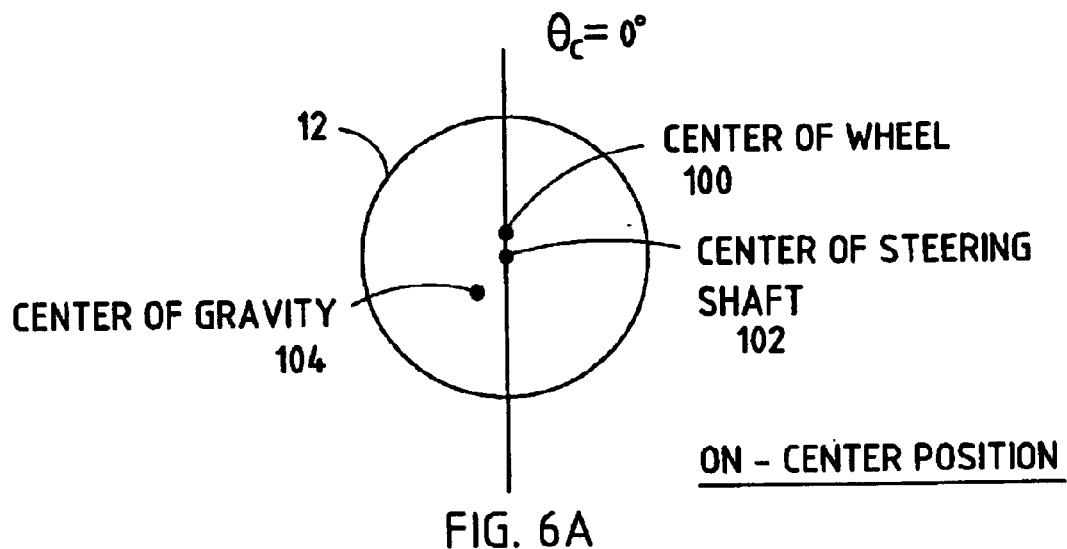
FIGS. 6A and 6B are schematic diagrams illustrating the steering wheel shown in an on-center position and an off-center steering position, respectively.
Figure 6B:
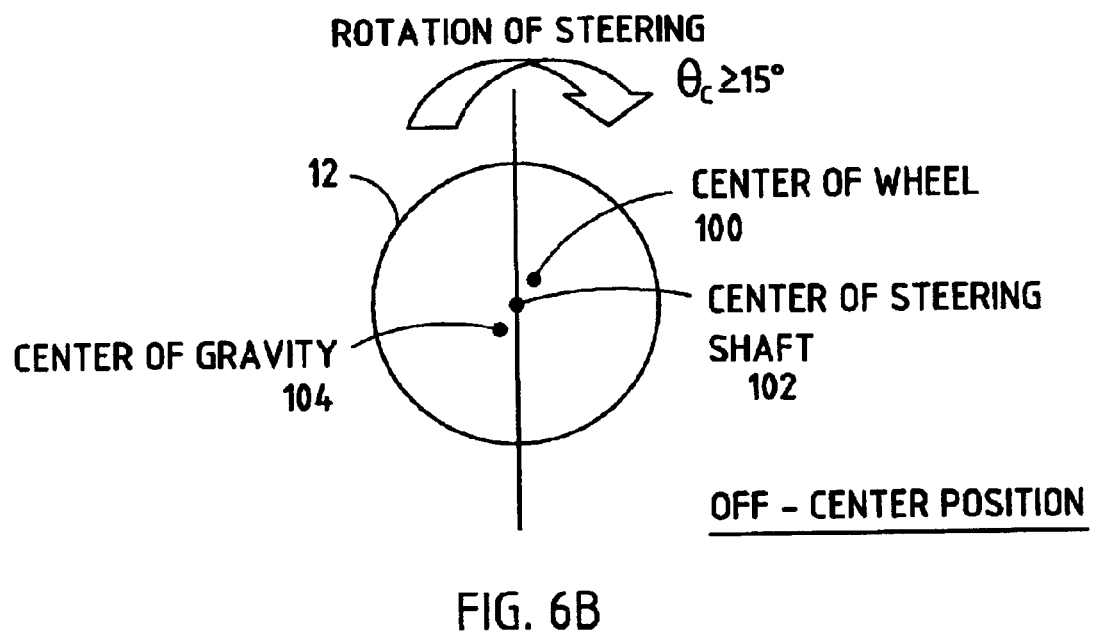

Referring to FIGS. 5A and 5B, a control methodology 70 for controlling the electric power assist steering system 10 with the H-infinity based control system 30 of the present invention is illustrated therein. The control methodology 70 includes step 71 of determining the steering column moment of inertia $J_C$ and steering column torsion stiffness $K_C$ for small on-center steering column angles. According to the embodiment shown, the small on-center steering column angles are for steering angles $\theta_c$ less than ±15 degrees (clockwise or counterclockwise) from the straight-ahead steering position. Similarly, in step 72, methodology 70 determines the steering column moment of inertia $J_C$ and torsion stiffness $K_C$ for large off-center steering column angles. According to the embodiment shown, the large off-center steering angles and defined as those angles greater than or equal to ±15 degrees (clockwise or counterclockwise) from the straight-ahead steering position. Accordingly, the first characteristics $J_C$ and $K_C$ for configuring the first H-infinity controller 64A are determined in step 71 for a small on-center steering angle range, while the second characteristics $J_C$ and $K_C$ for configuring the second H-infinity controller 64B are determined in step 72 for a larger off-center steering angle range. The first and second H-infinity controllers 64A and 64B are then designed in step 73 using the electric power assist steering model and Matlab toolboxes as explained above. This includes designing each of the H-infinity controllers 64A and 64B based on its own set of one or more steering characteristics. The design of the H-infinity controllers 64A and 64B are preferably done off-line as explained above.

Once the H-infinity controllers 64A and 64B are designed, the control methodology 70 estimates the driver's torque $T_d$est in step 74. Alternately, the driver torque $T_d$est may be measured directly. If an estimate of the driver's torque $T_d$est is employed, the torque estimate generally includes determining the transfer functions $G_{21}$, $G_{21}^{-1}$, $G_{22}$, $G_{31}^{-1}$, and $G_{32}$ which can be determined with the steering system off-line by applying a known driver input to the steering wheel and measuring selected inputs and outputs and then computing the transfer function by dividing the selected output over the selected input for the corresponding defined functions.

Proceeding to step 76, control methodology 70 calculates the desired assist torque $T_a$des for use as the feedforward control signal by using the boost curve. The desired assist torque $T_a$des can be generated based on the estimated driver torque $T_d$est and vehicle speed according to the map data provided in the boost curve. Proceeding to step 78, control methodology 70 calculates the equilibrium operating condition for $T_d$est, $T_c$est, $T_a$des, $\theta_c$, and $\dot{\theta}_m$ under the desired assist torque $T_a$des by using the electric power assist steering model. It should be appreciated that by providing for an equilibrium point, the present feedback signal more accurately determines the driver torque by providing an average signal to allow for the realization of smooth transitions between dynamic transitions during the vehicle operation.

Proceeding to step 80, control methodology 70 measures or estimates the pinion torque $T_c$est. Next, in step 82, the column angle $\theta_c$ is measured with the steering column sensor. In step 84, the electric motor velocity $\dot{\theta}_m$ is measured. In step 86, methodology 70 calculates the deviation of the system operating condition from the equilibrium point. This deviation provides the error signal that is sent to both of the first and second feedback H-infinity controllers. In step 88, the feedback control signal is calculated by using the error signal as processed by each of the H-infinity controllers. In step 89, the feedback control signal output from each of the first and second H-infinity controllers is passed to the switch. In addition, the switch also receives the sensed steering angle position $\theta_c$. Methodology 70 proceeds to decision step 90 to determine if the steering angle position $\theta_c$ is less than 15 degrees (clockwise or counterclockwise). If the steering angle position $\theta_c$ is less than 15 degrees, the switch is set to provide output U1 from the first H-infinity controller 64A in step 92. Otherwise, the switch is set to output as the feedback output U2 from the second H-infinity controller 64B in step 94. In step 96, the feedforward and selected feedback control signals are combined to produce the motor control command signal U for driving the electric motor. Finally, in step 98, the motor control command signal U is applied to the electric motor to drive the electric motor to achieve power steering assist with a desired steering feel.

Accordingly, the electric power assist steering system 10 of the present invention advantageously provides for electric power steering assist to a steering system of a vehicle by employing at least H-infinity controllers to ensure stability and robustness of the steering system and provide enhanced steering feel, without sacrificing system performance and desired steering feel. By employing H-infinity control, the present invention allows for the use of a very high gain boost curve and is able to maintain the stability as well as the robustness despite component deterioration, mechanical non-linearities, and road disturbances which may otherwise adversely effect the system. While one example of the steering assembly is shown herein employing a torque estimation, it should be appreciated that other steering assemblies may be employed in connection with the control system described herein, without departing from the spirit of the present invention. It should also be appreciate that while two H-infinity controllers are shown and described herein, the present invention may employ three or more H-infinity controllers without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electric power assist steering system for a vehicle, said steering system comprising:
    a steering assembly including a steering wheel connected to a steering column;
    an electric motor operatively engaged with said steering assembly for supplying steering torque assist;
    a torque detector determining a torque signal that is substantially indicative of driver torque applied to the steering assembly;
    a steering column sensor for sensing a steering angle of the steering column and generating a signal indicative thereof;
    a first H-infinity controller coupled in a feedback control loop for generating a first feedback control signal as a function of said torque signal and a first characteristic of the steering system;
    a second H-infinity controller coupled in the feedback control loop for generating a second feedback control signal as a function of said torque signal and a second characteristic of the steering system; and
    a switch for selecting one of the first and second feedback control signals as a function of the sensed steering angle.

2. The steering system as defined in claim 1, wherein said first and second characteristics are determined as a function of at least one of a moment of inertia of the steering column and a torsion stiffness of the steering column.

3. The steering system as defined in claim 2, wherein said first and second characteristics are each determined based on both of the moment of inertia and torsion stiffness of the steering column.

4. The steering system as defined in claim 1, wherein the selected feedback signal is combined with a feedforward signal to provide a motor control signal, and wherein the feedforward signal is generated by applying the torque signal to a boost curve.

5. A steering system as defined in claim 1, wherein said steering assembly further includes a shaft operatively coupled to the steering column and further connected to a rack and pinion assembly, wherein said electric motor is coupled to said shaft.

6. A control system for controlling electric motor torque assist to an electric power assist steering system for a vehicle having a steering assembly including a steering wheel connected to a steering column and an electric motor operatively engaged with the steering assembly for supplying steering torque assist, wherein said control system comprises:
    a torque detector for detecting driver torque and generating a driver torque signal indicative thereof;
    a steering column sensor for sensing angular position of the steering assembly;
    a first H-infinity controller coupled in the feedback control loop and generating a first feedback control signal as a function of the driver torque signal and a first characteristic of the steering system;
    a second H-infinity controller coupled in the feedback control loop and generating a second feedback control signal as a function of the driver torque signal and a second characteristic of the steering system; and
    a switch for selecting one of the first and second feedback control signals, wherein a motor control signal is generated as a function of the selected feedback control signal.

7. The control system as defined in claim 6, wherein said first and second characteristics are determined as a function of at least one of a moment of inertia of the steering column and a torsion stiffness of the steering column.

8. The control system as defined in claim 7, wherein said first and second characteristics are each determined based on both of the moment of inertia and torsion stiffness of the steering column.

9. The control system as defined in claim 6 further comprising a feedforward signal generated by applying the torque signal to a boost curve, wherein the selected feedback signal is combined with the feedforward signal to provide the motor control signal.

* * * * *